United States Patent [19]

Ohta et al.

[11] Patent Number: 4,556,800
[45] Date of Patent: Dec. 3, 1985

[54] OPTICAL IMAGE SENSOR APPARATUS WITH GROUPED PHOTOSENSORS CONNECTED IN COMMON

[75] Inventors: Hisao Ohta, Yokosuka; Toru Baji, Kodaira; Yuji Izawa, Sayama; Eizou Ebisui, Yokohama; Toshihisa Tsukada, Tokyo; Hideaki Yamamoto, Tokorozawa, all of Japan

[73] Assignees: Nippon Telegraph & Telephone Public Corp.; Hitachi, Ltd., both of Tokyo, Japan

[21] Appl. No.: 479,893

[22] Filed: Mar. 29, 1983

[30] Foreign Application Priority Data

Apr. 2, 1982 [JP]  Japan ................................. 57-53799

[51] Int. Cl.[4] ............................................. H04N 3/14
[52] U.S. Cl. .................................... 250/578; 358/213
[58] Field of Search ..................... 357/31–32; 250/211 J, 211 R, 578; 358/212–213

[56] References Cited

U.S. PATENT DOCUMENTS 4,390,791 6/1983 Hatanaka et al. ................... 250/578
4,407,010 9/1983 Baji et al. ............................ 358/213
4,430,672 2/1984 Berger ................................. 358/213
4,495,409 1/1985 Baji et al. ............................ 250/578

Primary Examiner—David C. Nelms
Assistant Examiner—J. Jon Brophy
Attorney, Agent, or Firm—Antonelli, Terry & Wands

[57] ABSTRACT

An optical image sensor apparatus in which a plurality of photosensors arrayed in a primary scanning direction are scanned to produce readout signals. The plurality of photosensors are classified into a number of groups each including a predetermined number of the photosensors, wherein those photosensors occupying equivalently the same position in the different groups are combined in common. The outputs of the photosensors are sequentially and selectively scanned on a group basis to produce readout signal for each of the groups. To provide a scanning readout operation at an increased speed, an integrating circuit is provided for each of the photosensors exchangeably for each group. The outputs of all the photosensors belonging to a given one of the group are simultaneously supplied to the respective integrating circuits. The readout signal output is obtained by scanning sequentially the outputs of the integrating circuits.

7 Claims, 8 Drawing Figures

OPTICAL IMAGE SENSOR APPARATUS WITH GROUPED PHOTOSENSORS CONNECTED IN COMMON

The present invention generally relates to the driving circuit used in a contact type optical image sensor apparatus. In particular, the invention concerns a signal readout circuit used in a facsimile, a character recognition system or the like for deriving electric signals from a plurality of photosensors arrayed closely on a document by means of a scanning operation.

As the optical sensor apparatus of the type mentioned above, there has been known an arrangement in which a plurality of linearly arrayed photosensors are scanned to read out the signals produced by the photosensors through photo-electric conversion by means of a scanning switch circuit. The optical sensor apparatus of such arrangement requires a number of scanning switches equal to the number of picture elements arrayed in the scanning direction as well as a corresponding number of readout lines or conductors, which gives rise to a serious problem from the view point of the manufacturing cost and the mass productivity in practical applications. As an attempt to overcome this difficulty, we have already proposed an optical sensor apparatus of such an arrangement in which the photosensors arrayed in the scanning direction are classified into a plurality of groups, wherein the scanning operation for reading out information furnished by the individual photosensors is effected by using a group selecting signal and a photosensor selecting signal. This operation may be referred to as a matrix drive operation. This approach makes it possible to decrease significantly the number of the scanning switches as well as the number of the readout lines or conductors (reference is to be made to Japanese Patent Application No. 129258/1980 titled "Photosensor").

Although the optical image sensor apparatus according to the above mentioned proposal is very effective for a scanning operation at a relatively low speed, it has been found that desired sensitivity can not be obtained for high speed operation in which the time taken for scanning a single picture element is, for example, of the order of 1 µs. In the optical sensor apparatus of this type, each of the photosensors is usually constituted by a series connection of a photodiode and a blocking diode, wherein one end of the series connection is connected to a voltage source of a driving circuit (or alternatively to ground), while the other end is connected to a readout amplifier through a switch circuit. With such circuit arrangement, the blocking diode tends to limit the available current for the reason described in detail hereinafter, involving difficulty in attaining a high-speed readout operation. As the result, it is difficult in practice to employ the optical sensor apparatus in a high speed facsimile in which the scanning is carried out at a speed less than 1 µS per picture element.

Accordingly, it is a primary object of the present invention to provide a driving circuit of an optical sensor apparatus which includes a plurality of photosensors arrayed in a main or primary scanning direction in which the operation speed for driving electrical signals by scanning selectively the photosensors can be increased up to a rate, for example, of the order of 1 µS per picture element or less, without degrading the sensitivity.

In view of the above and other objects which will become more apparent as this description proceeds, there is provided according to a feature of the present invention an optical sensor apparatus in which the photosensors arrayed linearly in the main or primary scan direction are classified into a plurality of groups each including a predetermined number of photosensors, wherein the groups of the photosensors are sequentially and selectively activated by a column control signal, while the photosensors constituting each group are sequentially and selectively scanned by a row control signal (this operation is referred to as matrix driving), the optical sensor further including a number of charge integrators each provided for each of the photosensors belonging to any given one of the groups, the outputs of the integrators being scanned by the row control signal to be read out.

In the driving circuits according to the invention, the time taken for reading out the information provided by the single picture element can be virtually increased while retaining the advantages of matrix driving, whereby the problem of the output voltage (sensitivity) being lowered in the high-speed readout operation can be solved to a satisfactory degree.

The above and other objects, features and advantages of the present invention will become more apparent from description of preferred embodiments of the invention. The description makes reference to the drawings, in which.

Figure 7:
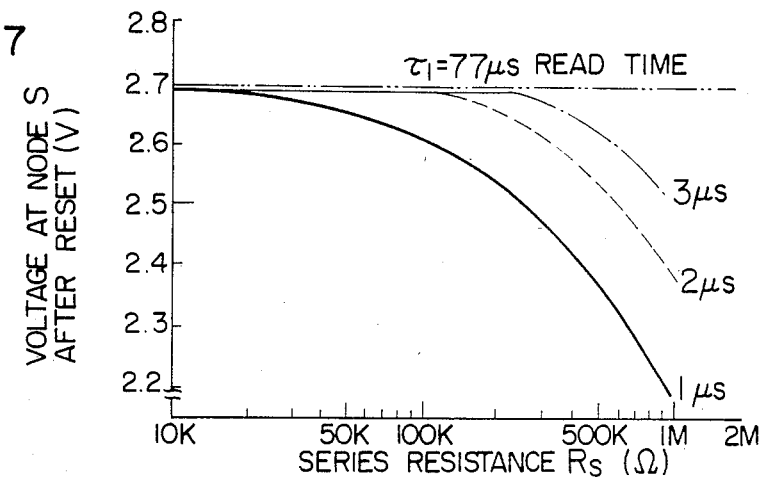
Figure 8:
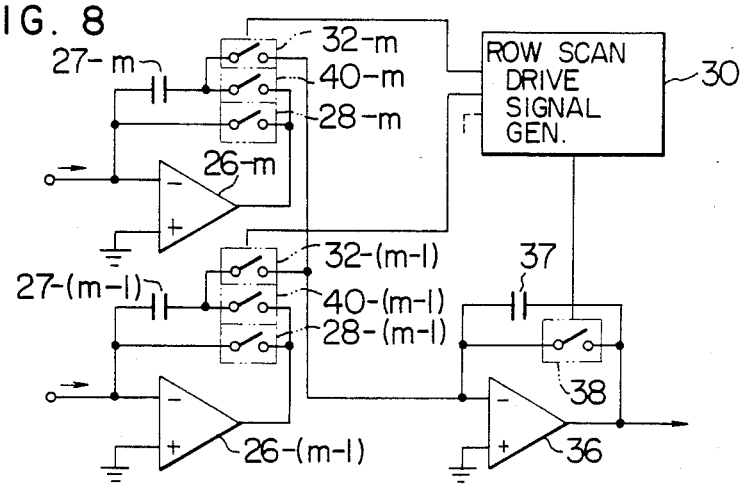

FIG. 7 is a characteristic view for graphically illustrating a relationship between the series resistance of a photosensor and the voltage after resetting in an optical sensor apparatus according to the present invention in comparison with that of the hitherto known optical sensor; and FIG. 8 is a circuit diagram showing an arrangement of the signal readout circuit for the optical sensor apparatus according to another embodiment of the invention.

For a better understanding of the present invention, description will first be made of a general structure or aspect of an optical image sensor apparatus to which the invention can be applied, by referring to FIGS. 1 and 2.

Figure 1:
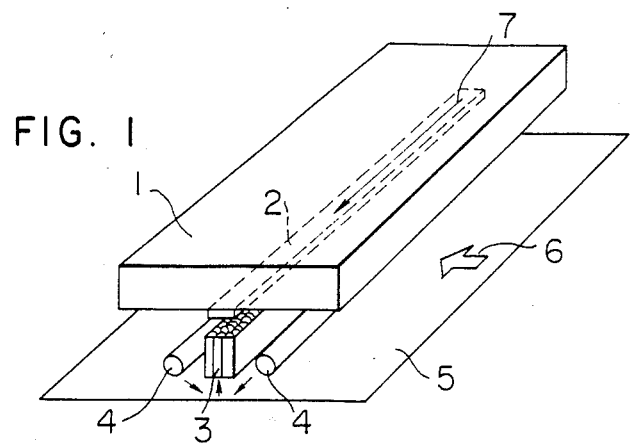
FIG. 1 shows in a perspective view a general structure of an optical sensor apparatus to which the present invention can be applied.

FIG. 1 shows in a perspective view the general configuration of an optical image sensor apparatus. There are disposed a pair of light sources 4 and a lens array 3 above a document 5 at a short distance thereto. Photosensors 2 such as photodiodes are disposed in opposition to the output ends of the individual lenses 3 and fixedly mounted on a supporting plate or substrate 1 on which scan drive circuits (not shown in FIG. 1) for the photosensors integrated in a few IC chips are mounted. An arrow 7 indicates a primary scan direction, while an arrow 6 indicates an auxiliary or secondary scan direction.

Figure 2:
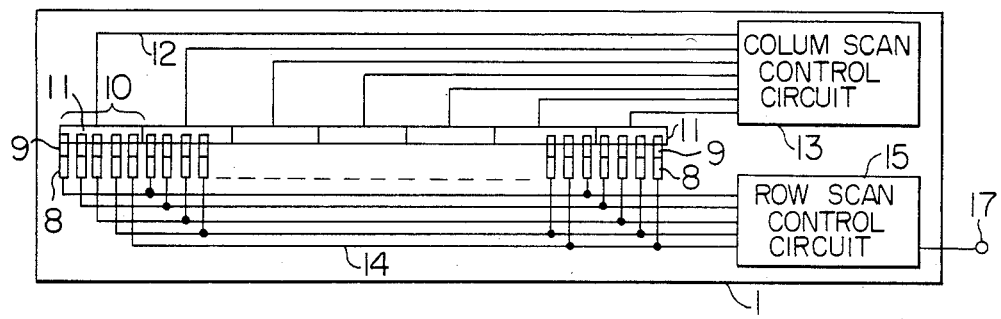
FIG. 2 shows in a schematic circuit diagram a scan drive circuit employed in the optical sensor apparatus shown in FIG. 1.

FIG. 2 shows the substrate 1 and the photosensor array 2 in a bottom view.

The photosensors each constituted by a series connection of a photodiode for photo-electrical conversion and a blocking diode for limiting signal flow to prevent mutual interference (cross-talk) among picture elements are provided on the substrate 1 in an array extending in parallel with the primary scan direction, as will be seen in FIG. 2. The photosensors are cleassified into a plurality of photosensor groups 10 each including a predetermined number of the photosensors. In each of the photosensor groups, the free end electrodes of the blocking diodes 9 belonging to any given one group are connected to a common electrode 11 which in turn is connected to a column scan (group selecting) control circuit 13 by way of a signal line 12. The same applies for the other photosensor groups. On the other hand, the free ends of the photodiodes 8 which are located at the equivalent positions in the different photosensor groups are connected in common to a row scan control (row selection) circuit 15 by way of respective common conductors 14. Electric signals obtained through the scan operation are taken out from an output terminal 17.

Figure 3:
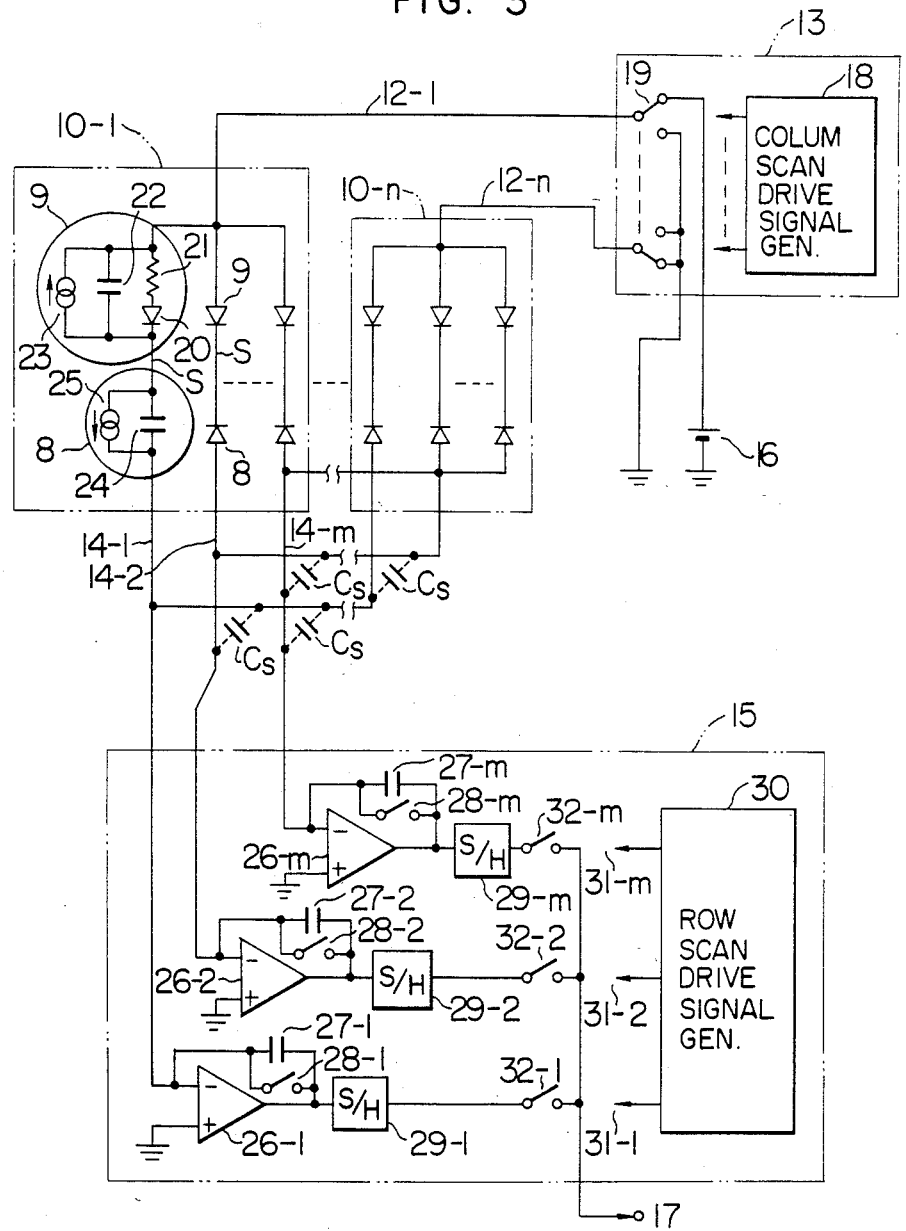
FIG. 3 is a circuit diagram showing a main portion of an optical sensor apparatus according to an exemplary embodiment of the invention.

FIG. 3 shows a circuit diagram of the optical image sensor according to an exemplary embodiment of the present invention. With respect to the physical structure, this optical image sensor is identical with the one shown in FIG. 2. Accordingly, the same parts as those shown in FIG. 2 are denoted by like reference numerals in FIG. 3.

In the column scan circuit 13, column scan switches 19 each including two switch contacts (two-way switch) are provided in a number n which corresponds to the number of the photosensor groups mentioned above and are connected to the photosensor groups 10-1, ..., 10-n through lines 12-1, 12-2, ..., 12-n, respectively. One of the two contacts of every switch 19 is connected in common to a bias voltage source 16, while the others are connected in common to ground. When a given one of the photosensor groups is to be selected, the associated switch 19 is closed to the contact connected to the bias voltage source 16 and the other switches are closed to the other contact connected to ground. The column scan drive (column selecting) signal generator circuit 18 serves to throw sequentially the number (n) of the switches 19 to the bias voltage source 16 on a one-by-one basis in dependence on a primary scan speed.

For convenience' sake, only the photosensor group 10-1 located leftmost as viewed in FIGS. 2 and 3 is shown in an equivalent circuit diagram, in which the photodiode 8 is represented by a parallel connection of a light current source 25 and an equivalent capacitance 24, while the blocking diode 9 is represented by a parallel connection of a dark current source 23, an equivalent capacitance 22 and a series connection of an ideal diode 20 and an equivalent series resistance 21.

Free ends of the photodiodes 8 located at the identical or equivalent positions in the different groups are connected together to respective common conductors or signal readout lines 14-1, 14-2, ..., 14-m which lead to the row scan control circuit 15. According to a feature of the present invention, integrators constituted by operational amplifiers 26-1, 26-2, ..., 26-m are provided in the row scan control circuit 15 in correspondence to the mutually corresponding photodiodes 8 of the photosensor groups. In each of the integrators, the operational amplifier 26 has an inverting input terminal to which the end of the associated photodiode 8 is connected and a non-inverting input terminal connected to ground. Feedback capacitors 27-1, 27-2, ..., 27-m are connected, respectively, between the output terminals and the noninverting input terminals of the individual operational amplifiers 26-1, 26-2, ..., 26-m. Resetting switches 28-1, 28-2, ..., 28-m are connected in parallel to the feedback capacitors 27-1, 27-2, ..., 27-m, respectively. The output signals of the operational amplifiers 26-1, 26-2, ..., 26-m are supplied to the inputs of sample and hold circuits 29-1, 29-2, ..., 29-m, respectively. The output signals of the sample and hold circuits 29-1, 29-2, ..., 29-m are sequentially applied to the output terminal 17 through switches 32-1, 32-2, ..., 32-m which are sequentially actuated in response to row scan signals 31-1, 31-2, ..., 31-m produced by the row scan drive signal generating circuit 30, whereby the scan output signal (readout signal) resulting from the readout scan operation is derived from the output terminal 17.

Figure 4:
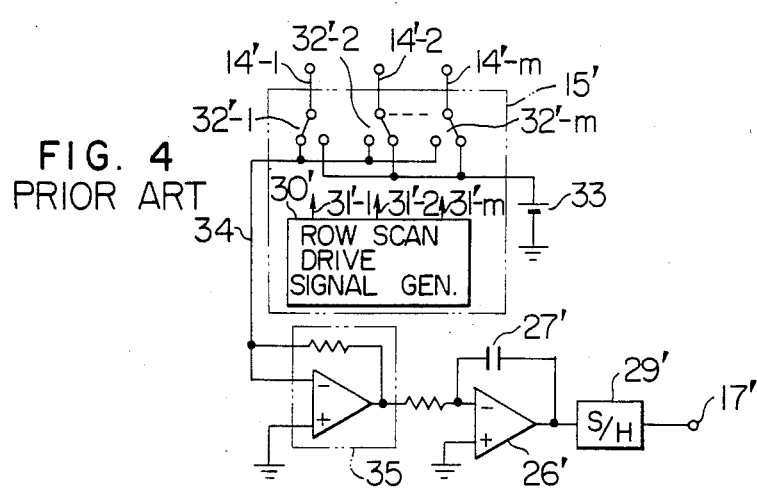
FIG. 4 is a circuit diagram showing a signal readout circuit for an optical sensor apparatus proposed previously by us

For elucidating advantageous effects of the circuit arrangement described above, reference is made to FIG. 4 which shows a circuit diagram of a row scan circuit employed in an optical image sensor apparatus related to our preceding proposal. In FIG. 4, the parts serving for substantially the same scan functions as those shown in FIG. 3 are denoted by like reference numerals each attached with a prime ('). As can be seen from FIG. 4, the lines 14'-1, 14'-2, ... 14'-m leading from the photodiodes are directly connected to the two-way switches 32'-1, 32'-2, ..., 32'-m which undergo sequential on-off scanning by the output signals 31'-1, 31'-2, ..., 31'-m of the row scan drive signal generating circuit 30' in such a manner that the switches 32'-1, 32'-2, ..., 32'-m are thrown to a voltage source 33, when not selected in the scanning sequence while being connected to a common line 34 upon being selected in the scanning sequence. Accordingly, the output signals produced by the photodiodes belonging to a same photosensor group are read out one by one in a serial mode.

The serial signals mentioned above are integrated by an integrator which consists of an operational amplifier 26' and a feedback capacitor 27' after having undergone a current-voltage conversion through an amplifier 35. The output signal of the integrator 27' is sampled and held by a sample and hold circuit 29' to be sebsequently taken out as the scan output signal (readout signal) from the output terminal 17'. In this way, it is difficult to provide enough time for reading out the output signal of the photosensor element (8, 9).

Now, operation of the device shown in FIG. 3 as well as advantages over the prior circuit shown in FIG. 4 (i.e. the reason why the circuit shown in FIG. 3 is capable of performing the scan readout operation at a much increased speed) will be elucidated.

Figure 5:
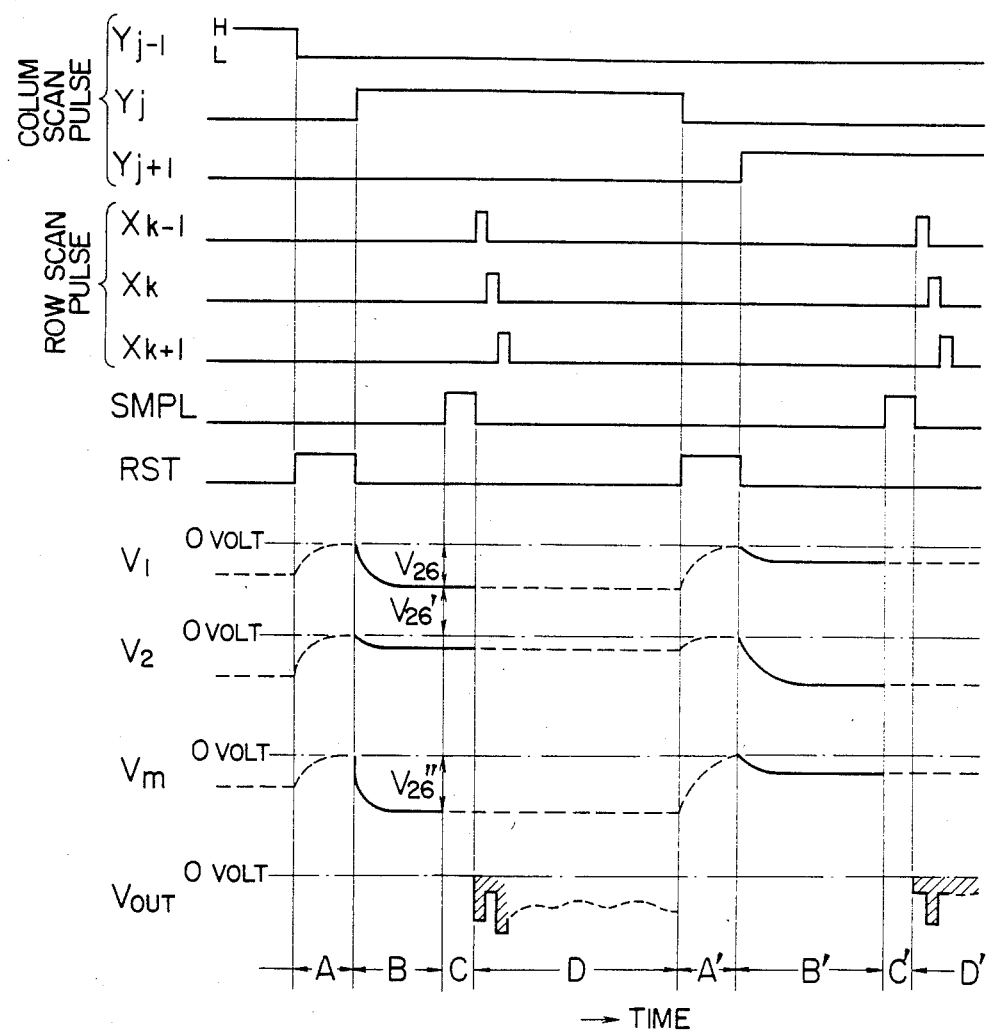
FIG. 5 shows a time chart for illustrating the operation of the circuit shown in FIG. 3.

FIG. 5 shows a time chart for illustrating operation of the circuit shown in FIG. 3. Three successive scan pulses produced by the column scan drive signal generating circuit 18 are shown at $Y_{j-1}$, $Y_j$ and $Y_{j+1}$ in FIG. 5, while three successive scan pulses produced by the row scan drive signal generating circuit 30 are shown at $X_{k-1}$, $X_k$ and $X_{k+1}$. It should here be mentioned that when the column scan drive signals $Y_{j-1}$, $Y_j$, $Y_{j+1}$ and the other scan drive signals are at a high level, the associated switches 19 are thrown to the bias voltage source 16, while they are thrown to the ground side when these signals Y are at a low level. Further, when the row scan drive signals $X_{k-1}$, $X_k$, $X_{k+1}$ and the others are at a high level, the associated switches 32 are turned on, while being turned off when these signals are at a low level.

When a given one of the switches 19 is thrown to the bias voltage source 16, the blocking diodes belonging to the photosensor group associated with that switch 19 become conductive, resulting in initial charges flowing to nodes or junctions S between the serially connected cathodes of the photodiodes 8 and the blocking diodes 9, respectively. Thus, the corresponding picture elements are reset to the initial state. When the switch 19 is subsequently changed oer to the contact connected to ground, the blocking diodes 9 become nonconductive, resulting in the nodes or junctions S being isolated from the lines 12-1, 12-2, ..., 12-n and lines 14-1, 14-2, ..., 14-m. The electric charge at the nodes S is absorbed by photocurrents 25 produced upon impingement of light onto the associated photodiodes 8 from the document 5. This type of operation (which may be referred to as a photocurrent storage mode) takes place sequentially in the groups 10-1, 10-2, ..., 10-n.

After lapse of a predetermined time, the groups 10-1, 10-2, ..., 10-n are sequentially selected and connected to the bias voltage source 16 through the respective switches 19 for the readout operation. The output signals of the photodiodes belonging to the selected group are supplied to the row scan control circuit 15. Next, the operation of the photosensor group 10-j selected in the row scan readout mode will be described in detail. After the readout operation of the group 10-j-1 has been completed, the switches 28-1, 28-2, ..., 28-m are simultaneously closed for a period A in response to a reset pulse RST, as a result of which the capacitors 27-1, 27-2, ..., 27-m are discharged, whereby the output signals $V_1$, $V_2$, ..., $V_m$ of the operational amplifiers (integrators) 26-1, 26-2, ..., 26-m are reset to zero volt. Subsequently, when the column scan pulse $Y_j$ is caused to become high, all the blocking diodes belonging to the group 10-j are made conductive, allowing a current to flow to the photodiodes to compensate the charge absorbed from the nodes during the photocurrent storage mode, whereby this current is integrated by the capacitors 27 to form signal charges. Thus, there appear at the output terminals of the integrators 26 the stored signal charges. After a predetermined time (integration time) B, the output voltages $V_1$, $V_2$, ..., $V_m$ of the integrators 26-1, 26-2, ..., 26-m are simultaneously sampled and held by the sample and hold circuits 29-1, 29-2, ..., 29-m (the sampling pulse SMPL is caused to be high level) in a period C. During a succeeding period D, the row scan pulses $X_1$, $X_2$, $X_3$ and so forth are sequentially outputted to sequentially and selectively turn on and off the switches 32-1, 32-2, ..., 32-m, whereby the scan output signal $V_{out}$ is produced at the output terminal 17. After the row scan operation of the group 10-j, the reset pulse RST is made high for a time A'. As a consequence, the switches 28 are closed to reset the outputs of the integrators to zero, as in the aforementioned period A. Next, the column scan pulse $Y_{j+1}$ for the next group 10-j+1 is turned high. Similar operation is repeated for each photosensor group.

Figure 6:
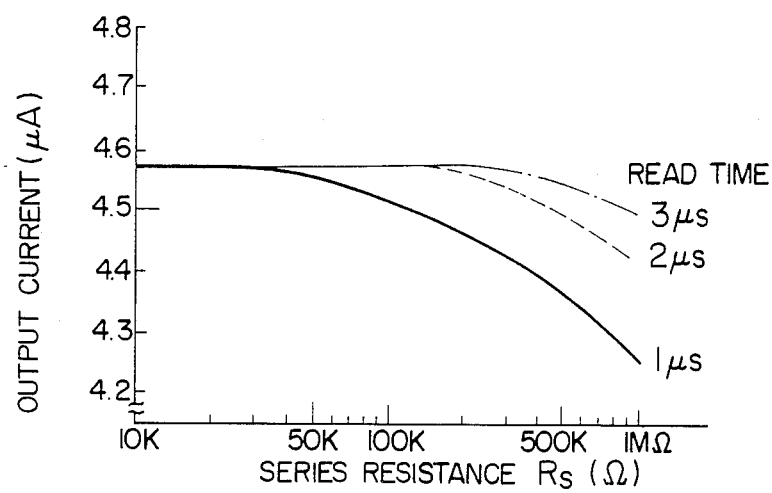
FIG. 6 is a view for graphically illustrating relationships between a series resistance of a photosensor and an output current thereof in a hitherto known optical sensor apparatus.

The embodiment of the invention described above allows the scanning speed to be much increased for the reason mentioned below. In the photosensor constituted by the photodiode 8 and the blocking diode 9, the signal charge is read out from the node or junction S and node S is charged to the initial charge simultaneously. In connection with the blocking diode 9 which is represented by the equivalent circuit 9', it is noted that the series resistor 21 and the diode 20 provide a current limitation, exerting influence on the readout speed. Such influence is graphically illustrated in FIG. 6, in which the series resistance $R_s(\Omega)$ of resistor 21 is taken along the abscissa with the output current being taken along the ordinate in $\mu A$, wherein times ($\mu S$) taken for reading a single picture element are taken as parameters. When the readout time (the time for which the blocking diode is in the conducting state) is as short as 1 $\mu S$, the output is significantly reduced as the series resistance $R_s$ increases. FIG. 7 graphically illustrates to what degree the potential at the junction S is restored to the initial state after the reading operation as a function of the series resistance $R_s$ with the readout times being taken as parameters. When the readout time used for reading the single picture element is of the order of 1 $\mu S$, the potential at the node S can no longer be restored to the initial value $V_0$ as the series resistance $R_s$ increases. In this case, the output voltage becomes lowered, eventually making the readout signal insignificant. It is common in practice to use as the blocking diode an amorphous diode which can be formed to have a large area through vapor deposition and exhibit a high ratio of rectification. However, since the resistance R of the amorphous diode is typically in the range of several hundred $K\Omega$ to several $M\Omega$ to make it difficult or even impossible to obtain the adequate signal current, the high reading or scanning speed of the order of 1 $\mu S$ per picture element is rendered impractical, when the readout operation has to be effected by every one of the photosensors on a one-by-one basis as is in the case of the row scan circuit shown in FIG. 4.

In contrast, in the case of the illustrated embodiment of the invention, the time taken for reading out a single picture element can be lengthened, as is indicated by B and C in FIG. 5, by performing the readout operation simultaneously for all the photosensor elements belonging to one group as described hereinbefore. By way of example, let's consider a matrix of 54 columns and 32 rows in a high speed facsimile system in which 5 mS is taken for the scanning of all the picture elements arrayed on a single scan line. Assuming that the time taken for scanning the single picture element is 0.5 $\mu S$, the duration of the period D shown in FIG. 5 is 864 $\mu S$ ($=0.5 \times 32 \times 54$) in total for the whole matrix. Assuming further that the reset time A is 3 $\mu S$ with the time taken for the sampling and holding operation being 3 $\mu S$, the total sum is 324 $\mu S$ $\{32(3+3) \times 54\}$ for the whole matrix. On these conditions, the time B available for the integration of the single group is about 71 $\mu S$ from $\{5$ mS$=(864+324)$ $\mu S\}54$. When a long time is available for the integrating operation (B), the photosensor substantially insusceptible to the influence of the series resistance $R_s$ can be readily realized. The result of the above analysis is graphically illustrated by a double-dot curve in FIG. 7. It will be appreciated that the voltage after the node S has been restored to the initial state is scarcely decreased even for a series resistance of 2 $M\Omega$. It should further be mentioned that the readout operation is performed simultaneously for the whole group according the the invention, whereby the problem of cross-talk can be significantly reduced. More specifically, referring to FIG. 3, there arises a possibility that the signals are mixed through a parasitic capacitance $C_s$ produced at an intersection of two readout lines since the output lines of the photodiodes are realized in a multilayer wiring structure. However, because the input capacitance of the integrator 26 is large as determined by $GC_F$ where G is an amplification factor of the amplifier 26 and $C_F$ represents the capacitance of the capacitor 27, the cross-talk is greatly reduced. More specifically, when an electric charge transferred to the integrator 26 from the relevant node or junction S is assumed to be unity (one), the electric charge flowing to the integrator 26 from the other nodes through the parasitic capacitance $C_s$ is given by $C_s/GC_F$. Assuming that a $SiO_2$-layer of 1 μm in thickness is used in the multilayer wiring and that the area of the line intersection is $100\times100$ μm$^2$, the value of $C_s$ is 0.34 pF. When the amplification factor G of the operational amplifier is about $10^4$ with the value of the capacitance for integration being 10 pF, the value of $C_s/GC_F$ is $3.4\times10^{-8}$, giving rise to no problem of cross-talk in substance.

FIG. 8 is a circuit diagram of the signal readout circuit for an optical image sensor according to another embodiment of the present invention. In this figure, the parts serving the same functions as those shown in FIG. 3 are denoted by like reference numerals. In the case of the signal readout circuit shown in FIG. 8, the sample and hold circuit is not provided for each of the integrating circuits (26, 27), but a single sample and hold circuit is employed in common which is constituted by an operational amplifier 36, a feedback capacitor 37 and a reset switch 38. With this circuit arrangement, the voltages due to the signal charges stored in the feedback capacitors 27-1, 27-2, ..., 27-m of the individual integrators 26 are sequentially taken out in response to the pulse signals $X_1, X_2, \ldots, X_m$ produced by the row scan drive pulse generating circuit 30 to be applied to the inverting input terminal of the operational amplifier 36 constituting a main part of the single sample and hold circuit. With this circuit configuration, influence due to unevenness in the characteristics of the operational amplifiers constituting the individual integrating circuits can be minimized.

In the foregoing, the present invention has been described in conjunction with the preferred embodiments illustrated in the drawings. It should however be appreciated that the invention is not restricted to these embodiments. Various modifications and variations will readily occur to those skilled in the art without departing from the spirit and scope of the invention. For example, the photosensor element may be realized by using a photoconductive film and a blocking diode or a combination of the photodiode and a capacitor.

What is claimed is:

1. An optical image sensor apparatus, comprising:
   a plurality of photosensors arrayed in a primary scan direction, said photosensors being classified into a number of groups each including a predetermined number of said photosensors, and the outputs of those photosensors which occupy equivalently the same positions in said groups being connected together;
   a column scan control circuit for sequentially selecting said groups; and
   a signal readout circuit for sequentially and selectively scanning the outputs of said photosensors in each of said groups to thereby produce readout signals, including a plurality of integrators each connected to a respective one of the commonly connected outputs of said photosensors, a first circuit for sequentially and selectively scanning the outputs of said plural integrators, and a row scan control circuit for generating a driving pulse signal for said first circuit.

2. An optical image sensor apparatus according to claim 1, wherein each of ssaid integrators includes an operational amplifier having an inverting input terminal connected to the output of the associated one of said photosensors and a non-inverting input terminal connected to ground, and a feedback capacitor connected between said inverting input terminal and the output terminal of said operational amplifier, said feedback capacitor being provided with a resetting switch.

3. An optical image sensor apparatus according to claim 1, wherein said photosensor is constituted by a series connection of a blocking diode and a photodiode.

4. An optical image sensor apparatus according to claim 1, wherein said first circuit includes a plurality of sample and hold circuits each connected to the output of a respective one of said plural integrators, a switch circuit for sequentially and selectively scanning the outputs of said plural sample and hold circuits, and an output circuit for producing a time series signal from the output signal of said switch circuit.

5. An optical image sensor apparatus according to claim 1, wherein each of said integrators includes an operational amplifier having an inverting input terminal connected to the associated one of said photosensors and a non-inverting input terminal connected to ground, a feedback capacitor connected between said inverting input terminal and the output terminal of said operational amplifier through first and second switches; said first circuit including a common sample and hold circuit, third switches each having one end connected to a junction between said second switch and said feedback capacitor of each of said integrators and the other end connected to the input of said sample and hold circuit, means for turning said third switches on and off in response to a drive pulse signal produced by said row scan control circuit, and an output circuit for producing a time series signal from the output of said sample and hold circuit.

6. An optical image sensor apparatus according to claim 1, wherein said photosensor is constituted by a series connection of a photodiode and a capacitor.

7. An optical image sensor apparatus according to claim 1, wherein said photosensor is constituted by a series connection of a blocking diode and a photoconductive fiber.

* * * * *